United States Patent [19]

Ladin

[11] 4,026,399

[45] * May 31, 1977

[54] SELF-ALIGNING THRUST BEARING ASSEMBLY

[75] Inventor: Eli M. Ladin, Ann Arbor, Mich.

[73] Assignee: Federal-Mogul Corporation, Detroit, Mich.

[ * ] Notice: The portion of the term of this patent subsequent to Jan. 13, 1993, has been disclaimed.

[22] Filed: Oct. 16, 1975

[21] Appl. No.: 623,181

[52] U.S. Cl. .................................. 192/98; 308/233
[51] Int. Cl.² ......................................... F16D 23/14
[58] Field of Search ........... 308/233; 192/98, 110 B

[56] References Cited
UNITED STATES PATENTS

| | | | |
|---|---|---|---|
| 2,785,023 | 3/1957 | Naumann | 308/233 |
| 3,741,361 | 6/1973 | Brandenstein | 192/98 |

Primary Examiner—Joseph F. Peters, Jr.
Assistant Examiner—Richard A. Bertsch
Attorney, Agent, or Firm—Robert F. Hess

[57] ABSTRACT

A self-aligning thrust bearing assembly comprising a thrust bearing unit in combination with a plate element adapted to be in direct pressure contact with thrust means, said bearing unit including a collar element disposed about its outer race. The said plate element may include a series of radially outwardly extending tab portions fitting within recess portions in said collar element whereby relative rotation between said plate element and said collar element disposed about said outer race is precluded; and a plurality of low friction elements affixed to said plate element which allows some degree of axial and/or lateral movement between said plate element and said outer race or said collar element and yet prevents direct contact between said plate element and said outer race or said collar element to facilitate self-aligning of the bearing elements. Alternatively, the said plate element may be formed without said tab portions and be free to rotate with respect to said collar element.

16 Claims, 8 Drawing Figures

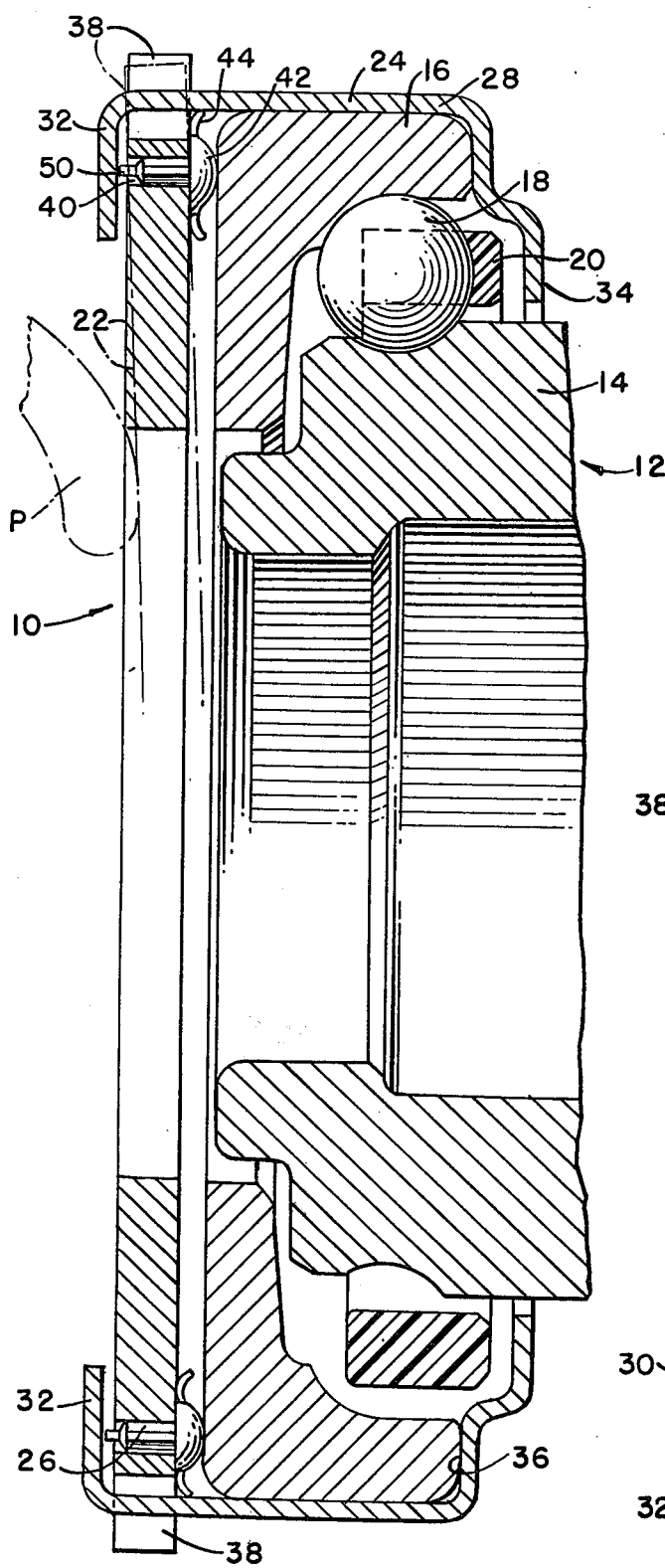
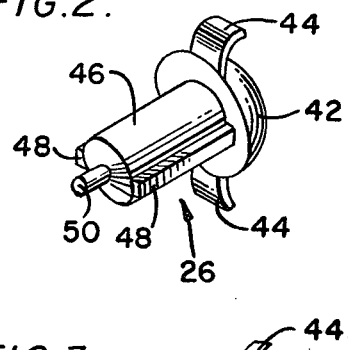
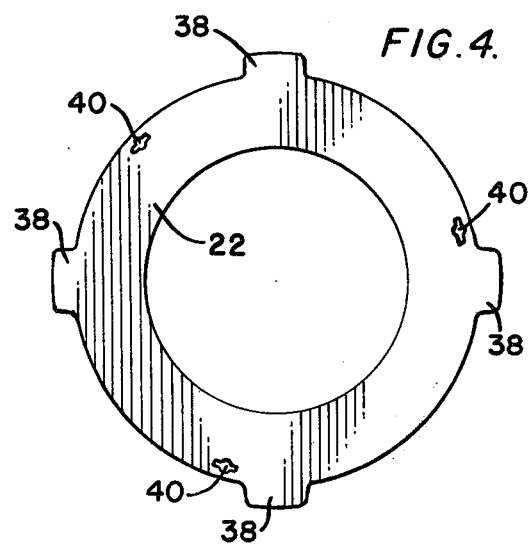
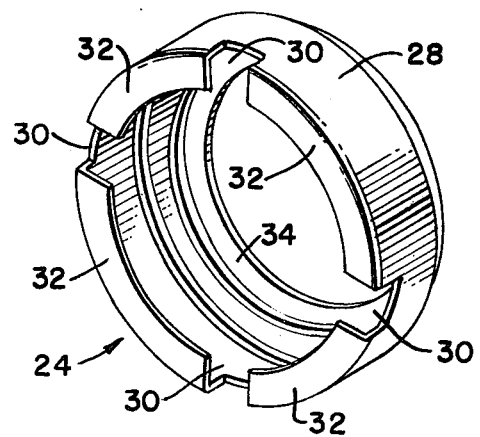

SELF-ALIGNING THRUST BEARING ASSEMBLY

BACKGROUND OF THE INVENTION

1. Field of the Invention

This invention relates generally to a new and improved bearing construction and more particularly to a self-aligning thrust bearing assembly particularly adapted to accommodate eccentric thrust loading or the like. The invention is adaptable for use in clutch release bearing arrangements of the type employed in automotive vehicles.

2. Description of the Prior Art

In the prior art uses of thrust bearings of this type an assembly is commonly disposed around and slidably movable along a fixed member such as an extension of the clutch housing or gear box with one side of the assembly being urged in an axial direction through suitable linkage or release fork when a clutch pedal is depressed to disengage the clutch and being urged through suitable spring means against the linkage or release fork in the opposite direction when pressure is removed from the clutch pedal to allow engagement of the clutch. It is generally well known that in such an arrangement the clutch release lever means operating on one side of the thrust bearing assembly comprise a plurality of finger-like elements with pressure contact points operating against a wear plate or face of the bearing. It is further known in the prior art that frequently the contact points of such finger-like elements fail to contact the bearing assembly at its wear surface simultaneously with the ultimate result that the thrust loads upon the wear surface are resolved into radial as well as axial loads. The resulting radial loading cause noise, vibrations, distortion of parts, rapid wearing out of parts, and other undesirable characteristics in many such bearing arrangements. Heretofore, efforts to alleviate the problems mentioned above have been made by way of providing means such as resilient mounts, for example, to automatically adjust the angle of the clutch release fork as the clutch disc facing becomes worn. Such efforts, however, have not proven to be fully satisfactory for various reasons. Exemplary of the prior efforts to find a solution various problems of vehicle clutch throw-out bearings of this type are U.S. Pat. No. 3,519,317 and U.S. Pat. No. 3,604,545.

BRIEF SUMMARY OF THE INVENTION

According to the present invention a new thrust bearing assembly, having significantly increased operational life, is provided.

Also, according to the present invention a thrust bearing assembly, having reduced vibration and noise characteristics, is provided.

Further, according to the present invention a self-aligning thrust bearing assembly, suitable for use in clutch release arrangements, is provided to accommodate eccentric axial loads.

Still further, according to the present invention a self-aligning thrust bearing wherein axial load receiving portions thereof inherently compensate for "out of square" or uneven application of load.

Briefly, in summary, the present invention relates to an improved self-aligning thrust bearing assembly, suitable for use in clutch arrangements in combination with clutch throw-out and/or actuating load levers, wherein the assembly includes means for contact with and to receive axially directed loads from clutch release lever members and the said means minimizes wear and compensates for out of square loading.

BRIEF DESCRIPTION OF THE DRAWINGS

For a better understanding of the present invention, reference may be made to the accompanying drawings in which:

FIG. 1 is a side elevational view in section of a preferred embodiment of the bearing assembly according to the present invention;

FIG. 2 is an enlarged view in perspective of a headed dowel member seen in the assembly in FIG. 1;

FIG. 3 is a side elevational view of the dowel member illustrated in FIG. 2;

FIG. 4 is a front elevational view of a dimensionally-reduced pressure receiving slidable plate seen in the assembly of FIG. 1;

FIG. 5 is a view in perspective of a dimensionally reduced support collar seen in the assembly of FIG. 1;

DESCRIPTION OF THE PREFERRED EMBODIMENT

Figure 6:
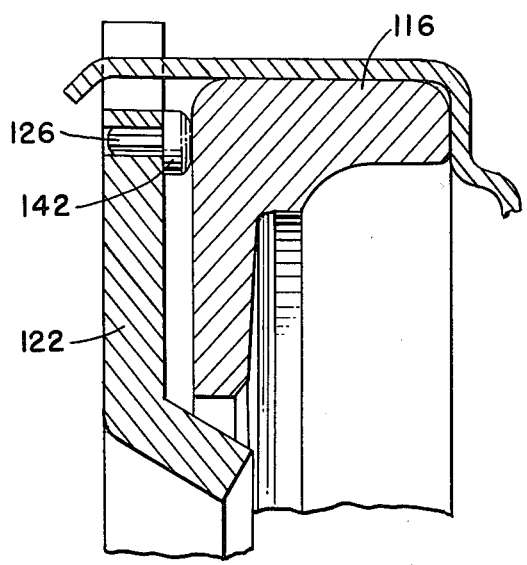
FIG. 6 is a side elevational view in section of a second embodiment according to the present invention with portions broken away and omitted.

The present invention will best be appreciated by considering first FIG. 1 in conjunction with FIGS. 2–5 in which a bearing assembly 10 is seen to comprise a conventional radial thrust type bearing clutch unit 12, which includes an inner race 14, an outer race 16, ball elements 18 and a retainer cage 20, in combination with a slider plate 22, a support collar 24, and a plurality of spacer buttons 26. Support collar 24, as best seen in FIG. 5, includes a generally axially extending cylindrical portion 28 which is disposed around and secured upon outer race 16, and a plurality of circumferentially spaced notches 30 at one end of cylindrical portion 28. Support collar 24 also includes a plurality of circumferentially spaced radially extending arcuate flanges 32 at the end adjacent notches 30. At its end remote from arcuate flanges 32 support collar is provided with a generally radially extending continuous flange 34, which includes an inner abutment surface 36. The support collar 24 may be formed from sheet metal with notches 30 stamped out. Slider plate 22, as best seen in FIG. 4, is generally in the form of an annular disc with a plurality of radial tabs 38 extending from the periphery thereof and a plurality of through apertures 40 formed therein. There may be as many as three apertures 40 formed in plate 22, which, for example, as illustrated are approximately 120° apart from each other. Spacer buttons 26 are each formed with a main head portion 42 including one or more flexible lips 44 extending radially therefrom and a dowel portion 46. Dowel portion 46 of each button 26 also may be formed with an axial key 48 thereon and a tip 50 on the end opposite the head portion 42. If desired, key 48 may be omitted from dowel portion 46 of spacer button. To enhance slidability of the associated parts, buttons 26 are made of low friction material such as Teflon, Nylon, carbon, etc.

The assembled bearing arrangement 10 includes a spacer button 26 disposed in each aperture 40 of plate 22 with head portions 42 adjacent a radial face of outer race 16 and inner abutment surface 36 of continuous flange 34 adjacent the opposite radial face of outer race 16. As seen in FIG. 1 plate 22 is situated within the space between arcuate flanges 32 of support collar 24 and outer race 16 with radial tabs 38 disposed in notches 30 and extending beyond the periphery of collar 24.

In operation of the radial thrust bearing clutch unit 12, outer race 16 may be shifted to the left or to the right with clutch release pressure member P in the form of a finger-like element in pressure engagement against plate 22 which in turn bears against outer race 16 with a load eccentric to ball elements 18 whereby the said load breaks down to radial and axial components. In the known bearing assemblies of the prior art such eccentric loads and radial and axial components thereof have a tendency to cause excessive noise, vibration, wear, heat, stresses between balls, races and cage members thus resulting in relatively reduced useful life thereof. According to the heretofore described construction tabs 38 of plate 22 which are disposed within notches 30 of collar 24 prevent relative rotation between plate 22 and the adjacent surface of outer race 16. Spacer buttons 26, which preferably are of Teflon or like material of low frictional qualities, allow relatively free sliding movement of plate 22 with respect to outer race 16 thereby preventing wear between thrust or pressure members P and the adjacent face of outer race 16. Further contributing to prevention of noise and vibration in the bearing assembly one or more of the resilient lips 44 and tip 50 of buttons 26 preclude metal-to-metal contact between plate 22 and outer race 16 and between plate 22 and support collar 24, respectively.

Further, with respect to spacer buttons 26, which are resilient in nature in a direction parallel to the axis of rotation of the assembled arrangement, the plate 22 will yield when one clutch or pressure finger strikes it before the other does. In this way, because the surface of plate 22 is initially in a plane perpendicular to the axis of rotation, the resiliency of buttons 26 impart a measure of movement to plate 22 which may be pushed askew of this plane from the solid position in FIG. 1 toward the exaggerated position in phantom. In this regard when two clutch fingers fail to simultaneously engage the back of the plate 22, that is, when the engagement is out of square, it will be compensated for by the resiliency of buttons 26, since plate 22 will yield as the first clutch pressure finger P presses against it so that a more even distribution of load is effected thereby reducing wear of the parts involved.

ALTERNATIVE EMBODIMENTS

Figure 7:
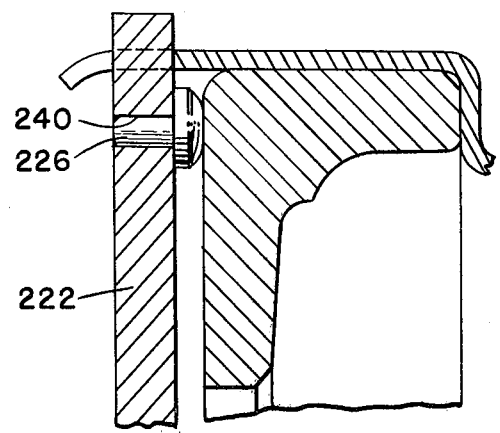
FIG. 7 is a side elevational view in section of a third embodiment according to the present invention with portions broken away and omitted.
Figure 8:
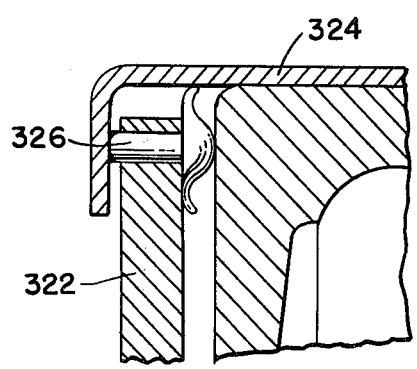
FIG. 8 is a side elevational view in section of a fourth embodiment according to the present invention with portions broken away and omitted.

Alternative embodiments of the present invention may be seen by referring to FIGS. 6, 7, and 8, in which parts of significance are designated by increasing reference numbers based upon corresponding reference numbers of the FIG. 1 by 100, 200, and 300 in successive embodiments.

In FIG. 6 a plurality of spacer buttons 126 with a generally flattened head 142 are disposed in matching apertures in sliding plate 122 so that a greater area or surface of contact is provided between head 142 and bearing race 116 than that in corresponding parts of the embodiment of FIG. 1.

In the embodiment of FIG. 7 spacer button 226 is formed with a dowel portion without a key element and thus may be situated within the aperture 240 of plate 222 and in contact therewith or it may be secured therein, for example, by bonding means, as glue, etc.

In the embodiment of FIG. 8 slider plate 322 and collar 324 are formed without inter-lock tab and recess portions so that some rotation therebetween may take place.

Further, instead of forming the spacer means as a plurality of buttons, it is within the contemplation of the present invention that the spacer means may comprise a single element in the form of an annulus.

Although a limited number of embodiments of the present invention have been illustrated and described herein, it is to be clearly understood that numerous other variations or modifications thereof may occur to those skilled in the art and what is intended to be covered herein is not only the specifically disclosed forms of the invention, but any and all modified forms as may come within the scope and spirit of this invention.

What is claimed is:

1. A self-aligning thrust bearing assembly comprising,
    a bearing unit including an inner race member, an outer race member, and a plurality of rolling elements therebetween,
    a thrust receiving member,
    means supporting said thrust receiving member and being disposed about and secured on one of said race members,
    means for allowing relative motion between said support means and said thrust receiving member as well as relative motion between said thrust receiving member and said bearing unit in a direction extending radially only of the longitudinal axis of said one of said race members, and in a direction extending along the longitudinal axis only of said one of said race members, and simultaneously in both said directions,
    said means for allowing relative motion including spacer means disposed between said thrust receiving member and an adjacent portion of one of said race members.

2. The bearing assembly of claim 1 wherein said spacer means in combination with said one of said race members having a lower coefficient of friction than that of said one of said race members in combination with said thrust receiving member.

3. The bearing assembly of claim 2 wherein said spacer means is in the form of annular member in axial contact with said outer race member.

4. The bearing assembly as defined in claim 1 wherein said spacer means being resilient relative to said thrust receiving member and said one of said race members and being in sliding contact with at least said thrust receiving member or said one of said race members whereby said relative motion between said thrust receiving member and said bearing unit along said longitudinal axis is substantially by means of compression of the spacer means whereas the relative motion laterally of said longitudinal axis is by means of sliding contact.

5. The bearing assembly of claim 4 wherein said spacer means are constituted by a plurality of circumferentially spaced buttons.

6. The bearing assembly of claim 5 wherein said thrust receiving member is in the form of a generally annular plate and said circumferentially spaced buttons are in contact with said annular plate.

7. The bearing assembly of claim 6 wherein said annular plate is provided with a plurality of circumferentially spaced apertures each of which has one of said circumferentially spaced buttons extending therein.

8. The bearing assembly of claim 7 wherein each of said buttons includes a dowel portion extending in one of said apertures of said annular plate.

9. The bearing assembly of claim 8 wherein each of said buttons includes a head portion extending from one end of said dowel portion in sliding abutment with an adjacent surface of said outer race member.

10. The bearing assembly of claim 9 wherein said supporting means includes inwardly extending radial flange means axially outwardly of said annular plate and each of said buttons includes an axial tip portion extending beyond said plate and adjacent said radial flange means to preclude contact between said radial flange means and said annular plate.

11. The bearing assembly of claim 10 wherein said supporting means includes notch portions adjacent said radial flange means and said annular plate includes radially outwardly extending tabs disposed within said notch portions to prevent relative rotation, but yet permit relative radial and/or axial movement between said annular plate and said supporting means which is secured on said outer race member.

12. The bearing assembly of claim 9 wherein said buttons are removably disposed in said apertures of said annular plate in mere contact with said apertures.

13. The bearing assembly of claim 9 wherein said buttons are secured in said apertures of said annular plate as by bonding means for example.

14. The bearing assembly of claim 9 wherein the head portion of each of said buttons is rounded and thereby provides point contact with said outer race member.

15. The bearing assembly of claim 9 wherein the head portion of each of said buttons is flat and thereby provides sliding surface-to-surface contact with said outer race member.

16. The bearing assembly of claim 9 wherein each of said buttons is resilient in a direction parallel to the axis of rotation of said bearing members and said annular plate is generally in a plane perpendicular to said axis of rotation whereby said annular plate may be pushed slightly askew to compensate for out of square pressure thereon and to effect even load distribution thereagainst.

* * * * *